United States Patent [19]

Yokota et al.

[11] Patent Number: 4,524,311

[45] Date of Patent: Jun. 18, 1985

[54] CONTROL FOR PUMPING DEVICES USED IN VEHICLES

[75] Inventors: Mitsuyoshi Yokota; Akio Matsumoto, both of Himeji, Japan

[73] Assignee: Mitsubishi Denki Kabushiki Kaisha, Tokyo, Japan

[21] Appl. No.: 549,182

[22] Filed: Nov. 4, 1983

[30] Foreign Application Priority Data

Nov. 12, 1982 [JP] Japan .......................... 57-171903[U]
Nov. 12, 1982 [JP] Japan .......................... 57-171906[U]

[51] Int. Cl.$^3$ ............................................. B60T 13/66
[52] U.S. Cl. ........................................ 318/481; 303/20
[58] Field of Search ............... 318/481, 482, 484, 645, 318/385; 303/20

[56] References Cited

U.S. PATENT DOCUMENTS

| | | | |
|---|---|---|---|
| 2,985,488 | 5/1961 | Stelzer | 303/31 X |
| 3,048,976 | 8/1962 | Grigsby et al. | 303/11 X |
| 3,252,420 | 5/1966 | Sorensen | 318/482 X |
| 3,377,537 | 4/1968 | Brailsford | 318/482 X |
| 3,498,228 | 3/1970 | Blumle et al. | 318/484 X |
| 3,503,652 | 3/1970 | Broek | 303/20 X |
| 3,698,772 | 10/1972 | Nixon | 303/20 X |
| 3,738,710 | 6/1973 | Pokrinchak et al. | 303/20 |
| 3,864,611 | 2/1975 | Chang | 318/484 |
| 4,000,450 | 12/1976 | Nurnberg | 318/481 |
| 4,028,593 | 6/1977 | Newell | 318/481 X |
| 4,163,586 | 8/1979 | Snyder | 303/20 |
| 4,290,045 | 9/1981 | Killinger | 303/20 X |

OTHER PUBLICATIONS

Horowitz & Hill, "The Art of Electronics", Cambridge University Press, 1980, pp. 52, 90, and 70.
Schaum's Outline Series on "Electronics Technology", McGraw-Hill Book Company, 1982, p. 209.
1982 Oldsmobile Service Manual, p. O.

Primary Examiner—Vit W. Miska
Assistant Examiner—Bentsu Ro
Attorney, Agent, or Firm—Lowe King Price & Becker

[57] ABSTRACT

Disclosed is a control for a pumping device in vehicle application in which, upon throwing a power switch (6) and closing a brake actuator switch (8), a second driver transistor (76) is rendered conductive and a first driver transistor (75) non-conductive, thereby rendering a power transistor (71) conductive. The power transistor in the conductive state enables a DC motor (2) to be supplied with a DC voltage from batteries (5). The DC motor drives a pump (1) which in turn feeds a pressure to activate a pressure-operating unit (10). A pressure detecting switch (4) detects the pressure of the pump and particularly provides a pressure detection signal when the pressure reaches a predetermined value. In response to the pressure detection signal the first driver transistor becomes non-conductive and the power transistor becomes conductive, thus supplying the DC voltage to the DC motor.

9 Claims, 4 Drawing Figures

CONTROL FOR PUMPING DEVICES USED IN VEHICLES

BACKGROUND OF THE INVENTION

1. Field of the Invention

The present invention relates to a control for pumps in vehicle application. More particularly, it relates to an improved control for controlling a vacuum pump for supply of a negative pressure to a force multiplier or a vacuum tank generally included in a braking apparatus for vehicles.

2. Description of the Prior Art

FIG. 1 is an electric circuit diagram showing a conventional control technique for pumps used in vehicles. Referring to FIG. 1, the conventional control will be discussed with respect to its schematic structure. The primary function of a vacuum pump 1 is to supply a negative pressure to a pressure-operating unit 10. A representative pressure-operating unit 10 comprises a force multiplier or a vacuum tank generally included in a vehicle braking apparatus. As is well known in the art, the force multiplier functions to augment the force of stepping when the driver steps on the brake. The vacuum tank is used to store a vacuum pressure set up by the vacuum pump 1. The vacuum pump 1 is driven by a DC motor 2 which, combined with the vacuum pump 1, forms a vehicle pumping device. The DC motor 2 is controlled by a control circuit 3 which includes a power transistor 31 connected in series with the DC motor 2, a driver transistor 32 controlling operation of the power transistor 31, base resistors 33 and 34 for the respective transistors 31 and 32, a surge absorbing diode 35 and a base-emitter resistor 36. The DC motor 2 is fed with a DC voltage from batteries 5 via a power switch 6. A pressure detecting switch 4 is provided in conjunction with the force multiplier or vacuum tank for detecting negative pressure generated by the vacuum pump 1 and has a normally closed contact which is open when the negative pressure reaches a predetermined value.

FIG. 2 is a diagram which will give a better understanding of operation of the conventional control as shown in FIG. 1. Operation of the conventional control will be described by reference to FIGS. 1 and 2. Under the condition where the engine (not shown) has not yet started and the vehicle is at a stop, the negative pressure in the force multiplier or the vacuum tank is generally small and approximately close to the atmospheric pressure. The contact of the pressure detecting switch 4 is therefore in the closed position. Upon closure of the power switch 6 under these circumstances the driver transistor 32 is fed at its base with a low level signal from the pressure detecting switch 4 and rendered non-conductive. Current flows from the batteries into the base of the power transistor 31 through the power switch 6 and the base resistor 33, rendering the power transistor 31 conductive. In response to conduction of the power transistor 31, the DC voltage from the batteries 5 is supplied to the DC motor 2 which in turn rotates to activate the vacuum pump 1.

It is noted that the pressure in the force multiplier or the vacuum tank decreases gradually and the negative pressure increases. If the negative pressure in the force multiplier or the vacuum tank reaches a first predetermined value, then the normally closed contact of the pressure detecting switch 4 is opened. The driver transistor 32 becomes conductive in response to the base current flowing from the batteries 5 through the power switch 6 and the base resistor 34. As a result, the power transistor 31 becomes non-conductive and the DC motor 2 is no longer supplied with the DC voltage so that the vacuum pump 1 comes to a halt. As the negative pressure in the force multiplier or the vacuum tank decreases and falls to a second predetermined value, the contact of the pressure detecting switch 4 is closed again and the DC motor 2 is energized. The above described sequence of operations is repeated in such manner as to keep the negative pressure in the force multiplier or the vacuum tank within the range from the first predetermined value to the second.

However, provided that braking is effected intermittently as seen in FIG. 2(a) in the conventional control, the negative pressure for activating the force multiplier demonstrates a sharp decline as plotted with the solid line in FIG. 2(b). Operation of the force multiplier is less powerful and demands an even greater force of brake stepping. The problem of the conventional control is inability to assure smooth braking.

SUMMARY OF THE INVENTION

It is the primary object of the present invention to provide a control for a pumping device in vehicle application which serves to increase the pressure in a pressure-operating unit upon throw of an actuator switch, thus smoothing braking or other functions.

Briefly speaking, a control for a pumping device embodying the present invention is designed to drive a DC motor upon throw of an actuator switch to activate a pump and enable a pressure-operating unit with the pressure in the pump in such manner as to increase the pressure.

According to the present invention whereby the DC motor is driven for activation of the pump upon throwing the actuator switch, the pump is constantly driven to assure an increase in the pressure in the pump whenever the pressure-operating unit is to be activated. This smooths operation of the pressure-operating unit and minimizes the force of brake stepping in the case that the pressure-operating unit is a braking force multiplier.

In a preferred embodiment of the present invention, there is provided a pressure switch which detects the pressure in the pump and becomes operable to drive the DC motor when the pressure being detected reaches a predetermined value. This preferred embodiment of the present invention is able to increase the pressure in the pump because the DC motor is always driven to activate the pump and generate pressure therein when the pressure in the pump reaches the predetermined value.

These objects and other objects, features, aspects and advantages of the present invention will become more apparent from the following detailed description of the present invention when taken in conjunction with the accompanying drawings.

DESCRIPTION OF PREFERRED EMBODIMENTS

Figure 1:
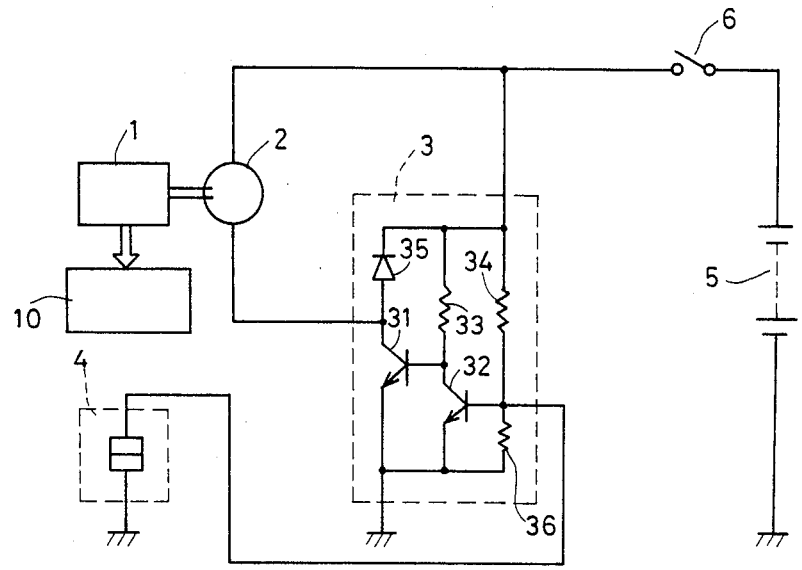
FIG. 1 is an electric circuit diagram of a control apparatus for a conventional pumping device in vehicle application.
Figure 3:
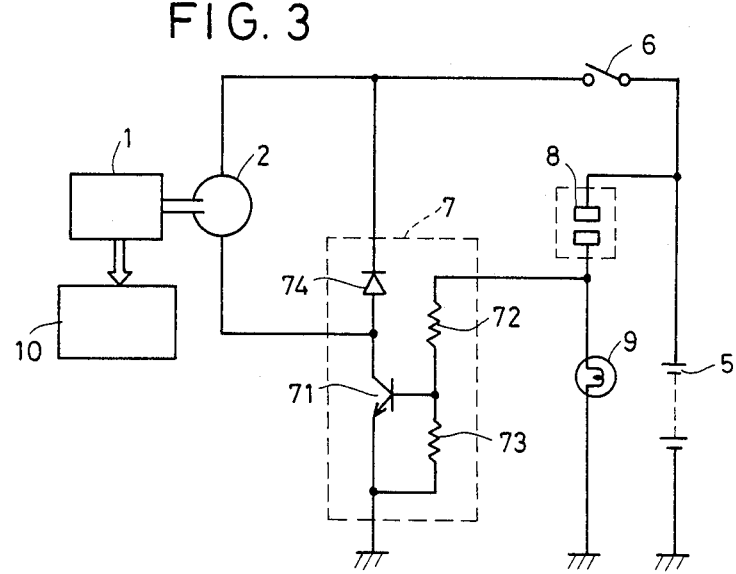
FIG. 3 is an electric circuit diagram of an embodiment of the present invention.

In FIG. 3, there is illustrated an electric circuit diagram of an embodiment of the present invention. The embodiment as shown in FIG. 3 is analogous to the foregoing circuit arrangement in FIG. 1 except in the control circuit 7. That is, the control circuit 7 is defined by a power transistor 71, a base resistor 72, a base-emitter resistor 73 and a surge absorbing diode 74. A brake actuator switch 8 has a normally open contact which is closed when the driver steps on the brake pedal, and when the normally open contact is closed the base of the power transistor 71 is fed with a DC voltage from the batteries 5 by way of the base resistor 72. Furthermore, a brake displaying lamp 9 is connected to the brake actuator switch 8 to display that the brake pedal has been stepped on by the driver.

Operation of the control as shown in FIG. 3 will now be discussed. Before braking is effected a certain negative pressure remains in the force multiplier or the vacuum tank. Should braking take place under these circumstances, the contact of the brake actuator switch 8 is placed into the closed position to permit base current to flow from the batteries 5 into the power transistor 71 by way of the brake actuator switch 8 and the base resistor 72, thus making the power transistor 71 conductive. The result is that the DC motor 2 rotates to activate the vacuum pump 1 so as to generate a negative pressure. However, if braking is interrupted, then the contact of the brake actuator switch 8 is placed into the open position so that no current runs through the base of the power transistor 71 and the power transistor 71 becomes non-conductive with resulting stop of the DC motor 2.

Figure 2:
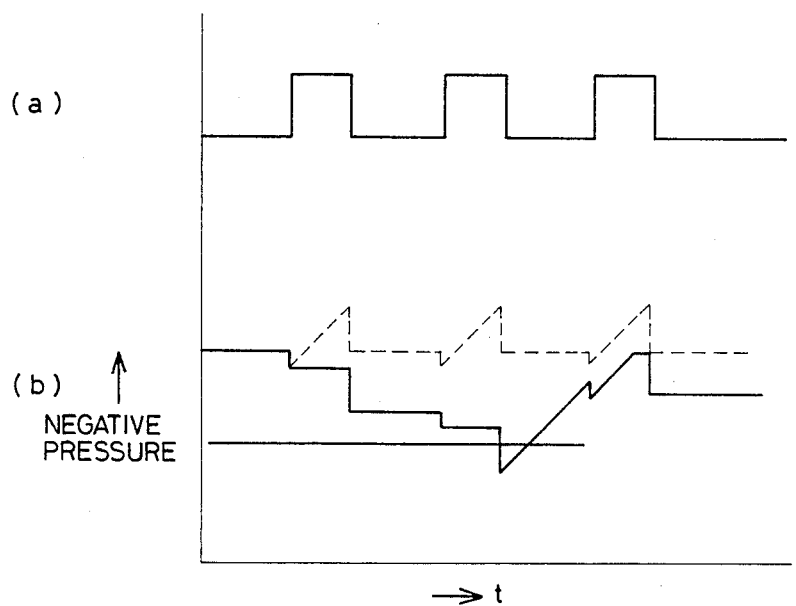
FIG. 2 is a view for explaining operation of the control apparatus as illustrated in FIG. 1.

Since in the illustrated embodiment the DC motor 2 is driven during the course of braking as stated previously, the negative pressure in the force multiplier or the vacuum tank is increased, as plotted with the dot line in FIG. 2(b). This is useful in reducing the force of stepping to be applied to the brake pedal and in smoothing braking operation.

Figure 4:
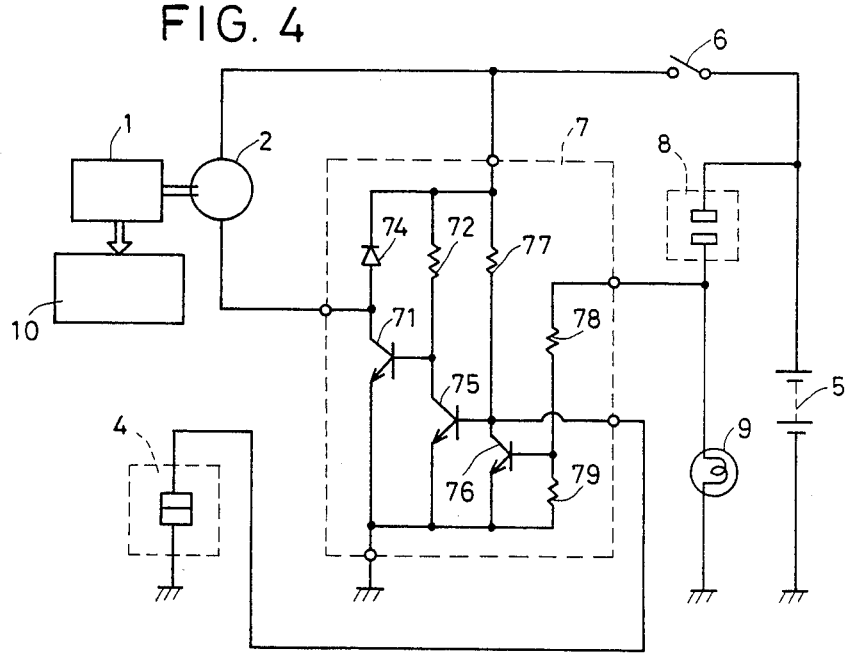
FIG. 4 is an electric circuit diagram of another embodiment of the present invention.

FIG. 4 is an electric circuit diagram of another embodiment of the present invention. The embodiment of FIG. 4 is adapted to rotate the DC motor 2 even when the pressure detecting switch 4 becomes operable and is analogous to the above embodiment of FIG. 3 except in the control circuit 7. That is, the control circuit 7 includes a power transistor 71, a first driver transistor 75, a second driver transistor 76, base resistors 72, 77 and 78 for the respective transistors 71, 75 and 76, a base-emitter resistor 79 for the second driver transistor 76 and a surge absorbing diode 74.

Operation of the embodiment of FIG. 4 will be discussed below. Upon closure of the contact of the brake actuator switch 8 DC current flows into the base of the second driver transistor 76 via the base resistor 78, rendering the second driver transistor 76 conductive. Simultaneously, the first driver transistor 75 becomes non-conductive and DC current flows from the batteries 5 to the base of the power transistor 71 through the power switch 6 and the base resistor 72, thus making the power transistor 71 conductive. As a result, the DC motor 2 rotates to activate the vacuum pump 1. If the contact of the brake actuator switch 8 is opened, then the second driver transistor 76 becomes non-conductive so that DC current flows from the batteries 5 to the base of the first driver transistor 75 through the power switch 6 and the base resistor 77, rendering the first driver transistor 75 conductive. Consequently, the power transistor 71 becomes non-conductive with its base maintained at the ground potential. The DC motor 2 discontinues rotating and the vacuum pump 1 is disabled. If under these circumstances the negative pressure in the vacuum tank reaches a predetermined value as detected by the pressure detecting switch 4, then the base potential of the first driver transistor 75 is equal to the ground potential. Therefore, the first driver transistor 75 becomes non-conductive and the power transistor 71 becomes conductive, thus rotating the DC motor 2 and activating the vacuum pump 1.

The alternative embodiment, as noted earlier, is able to ensure a greater negative pressure in the force multiplier or the vacuum tank, enrich performance of the braking force multiplier and reduce requirement for brake stepping force since the DC motor 2 is rotated to activate the vacuum pump 1 not only when the brake actuator switch 8 is operated but also when the pressure detecting switch 4 finds a decline in the negative pressure.

Whereas the pressure-operating unit responsive to the pressure from the pump has particularly been described and illustrated in terms of the braking force multiplier and the vacuum tank in the foregoing disclosure, the present invention should not be limited thereto and is equally applicable to door switching devices and other mechanisms.

Furthermore, it is obvious that the pressure-operating unit has been illustrated as being driven with the negative pressure from the vacuum pump 1 but it may be activated with a positive pressure from a compressor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control for a pumping device for use in a vehicle comprising:
   power supply means;
   a motor supplied with electrical power from said power supply means;
   a pumping means for use in the vehicle including a pump activated by said motor for generating a pressure;
   a pressure operating unit operable by the pressure from said pump;
   control means for enabling said motor to activate said pump;
   first actuating switch means for activating said motor in response to a particular operation of said vehicle, and
   second actuating switch means, including pressure detecting switch means, for activating said motor in response to a result of a comparison of pressure, generated by said pump, with a threshold value,
   said control means including means for enabling said motor in response to operation of either of said first or second actuating means.

2. A control for a pumping device for use in a vehicle as recited in claim 1 wherein said first actuating switch means comprises brake switch means responsive to a braking operation for activating said motor and said pump responsive thereto, said pump comprises a negative pressure pump means, and said pressure detecting switch means comprises means outputting a signal in response to detection of an absolute value of said negative pressure being lower than a predetermined minimum value therefor, whereby said control means is operable for enabling said motor to activate said negative pressure pump means in response to a braking operation or in response to reduction of negative pressure.

3. A control for a pumping device for use in vehicles comprising:
- a DC power supply providing a DC voltage;
- a DC motor supplied with a DC voltage from said DC power supply;
- a pumping device for use in the vehicles, including a pump activated by said DC motor for generating a pressure;
- a pressure-operating unit operable with the pressure from said pump;
- a control means for enabling said DC motor; and
- a brake switch means responsive only to activation of a brake pedal for actuating said control means to enable said DC motor.

4. A control for a pumping device for use in vehicles as set forth in claim 3 wherein said control means comprises:
- transistor means operable in a conductive state in response to actuation of said brake switch means and in a nonconducting state otherwise.

5. A control for a pumping device for use in vehicles as set forth in claim 4 wherein said transistor means includes base, emitter and collector terminals, said collector and emitter terminals being connected in series with said DC motor and said base terminal connected to said brake switch means.

6. A control for a pumping device for use in vehicles as set forth in claim 3 wherein
said pump includes a vacuum pump.

7. A control for a pumping device for use in vehicles as set forth in claim 3 wherein
said pump includes a compressor.

8. A control for a pumping device for use in vehicles comprising:
- a DC power supply providing a DC voltage;
- a DC motor supplied with a DC voltage from said DC power supply;
- a pumping device for use in the vehicles, including a pump activated by said DC motor for generating a pressure;
- a pressure-operating unit operable with the pressure from said pump;
- a control means for enabling said DC motor;
- a brake switch means responsive to activation of a brake pedal for actuating said control means to enable said DC motor; and
- a pressure detecting switch for detecting the pressure provided by said pump, said pressure detecting switch being operable when the pressure reaches a predetermined value,
said control means including a means for driving said DC motor in response to operation of said pressure detecting switch.

9. A control for a pumping device for use in vehicles as set forth in claim 8 wherein said control means comprises:
- a first switching means connected in series with said DC motor for selectively supplying said DC voltage from said DC power supply to said DC motor through its switching operation;
- a second switching means rendered conductive in response to closure of said brake switch means, DC motor; and
- a third switching means rendered non-conductive in response to operation of said pressure detecting switch, for switching said first switching means to enable said DC motor.

* * * * *